(12) United States Patent
Wade et al.

(10) Patent No.: US 11,554,559 B2
(45) Date of Patent: Jan. 17, 2023

(54) CAUL PLATE FOR IRREGULAR SURFACE

(71) Applicant: The Boeing Company, Chicago, IL (US)

(72) Inventors: Daniel J. Wade, Carbonado, WA (US); Mathew K. Lathrop, Orting, WA (US); Michael G. Cantiberos, Gig Harbor, WA (US); Rogelio Innocencio Garcia, Spanaway, WA (US)

(73) Assignee: The Boeing Company, Chicago, IL (US)

( * ) Notice: Subject to any disclaimer, the term of this patent is extended or adjusted under 35 U.S.C. 154(b) by 490 days.

(21) Appl. No.: 16/710,371

(22) Filed: Dec. 11, 2019

(65) Prior Publication Data

US 2021/0178707 A1    Jun. 17, 2021

(51) Int. Cl.
  *B29C 70/44*    (2006.01)
  *B29C 70/34*    (2006.01)
  B29C 65/00    (2006.01)
  B29L 31/30    (2006.01)
  B64C 1/06    (2006.01)
  B64C 1/00    (2006.01)
  B64C 1/12    (2006.01)

(52) U.S. Cl.
  CPC ............ *B29C 70/44* (2013.01); *B29C 70/342* (2013.01); *B29C 66/721* (2013.01); *B29L 2031/3085* (2013.01); *B64C 1/064* (2013.01); *B64C 1/12* (2013.01); *B64C 2001/0072* (2013.01)

(58) Field of Classification Search
  CPC ..... B29C 70/44; B29C 70/549; B29C 70/342; B29C 66/721; B64C 1/12
  See application file for complete search history.

(56) References Cited

U.S. PATENT DOCUMENTS

| | | | | |
|---|---|---|---|---|
| 5,242,523 A | * | 9/1993 | Willden | B29C 70/44 244/119 |
| 5,683,646 A | * | 11/1997 | Reiling, Jr. | B29C 70/544 264/225 |
| 2011/0132523 A1 | * | 6/2011 | Evens | B32B 43/00 374/142 |
| 2012/0258276 A1 | * | 10/2012 | Modin | B29C 70/461 156/443 |
| 2014/0134383 A1 | * | 5/2014 | Hugon | B29C 66/7392 156/182 |
| 2015/0174844 A1 | * | 6/2015 | Brizon | B29C 70/44 156/535 |
| 2017/0057182 A1 | * | 3/2017 | Bernetich | B29C 70/546 |
| 2017/0326808 A1 | * | 11/2017 | Kizhakkepat | B29C 70/545 |
| 2020/0070436 A1 | * | 3/2020 | Miller | B29C 33/005 |
| 2020/0254702 A1 | * | 8/2020 | Saini | B29C 43/36 |

* cited by examiner

*Primary Examiner* — Michael H Wang
(74) *Attorney, Agent, or Firm* — Duft & Bornsen, PC

(57) ABSTRACT

Systems and methods for a caul plate for an irregular surface. One embodiment is a caul plate for co-curing or co-bonding a first composite part and a second composite part. A body of the caul plate includes a lower surface to face a top surface of the first composite part, a reference edge to locate the second composite part on the first composite part, and an upper surface that is opposite to the lower surface. The lower surface includes one or more bends to match one or more slopes in the top surface of the first composite part. The one or more bends correspond with ply changes in the first composite part.

20 Claims, 7 Drawing Sheets

CAUL PLATE FOR IRREGULAR SURFACE

FIELD

The disclosure relates to the field of composite parts, and in particular, to caul plates for composite parts.

BACKGROUND

Aircraft parts, such as wing components, often comprise composite parts made by a resin infusion process in which a stack of porous material (known as a preform) is filled with a liquid resin. After infusion, the resin matrix is cured to solidify the combined material into a unified rigid composite. The result is a cost-effective way of manufacturing structural materials that exhibit enhanced physical characteristics (e.g., strong, lightweight, resistive to harsh environments, etc.) useful for high-performance applications such as aerospace.

Caul plates are often used during fabrication to shape the preform and provide a smooth, aerodynamic surface on the finished part. The caul plate is typically rigid to transfer uniform compaction pressure during cure. In addition to forming a smooth surface on the finished part, the caul plate helps to reduce or eliminate voids and distortion (i.e., bow waves) within the part that can cause stress concentrations, delamination, and other part failures.

However, a preform is sometimes designed with ply drop-offs or pad-ups to obtain a desired thickness or weight for the part. Although these ply drop-offs or pad-ups impart very small fluctuations in the surface of the preform, a typical rigid caul plate is flat and thus does not conform to the surface geometry changes. Areas of the preform that have a low-pressure condition underneath the caul plate may be subject to voids or bow waves in the cured part.

SUMMARY

Embodiments described herein provide a caul plate for an irregular surface. The caul plate includes, on its surface which faces a composite part, small steps or ramps that match the fluctuating geometry of the composite part caused by ply drop-offs or ply pad-ups. This enables improved contact between the caul plate and the composite part to more effectively compact the part from cure process pressure. This compaction pressure may reduce or eliminate porosity, resin pooling from caul plate bridging, and out-of-plane distortion. This advantageously increases component yield by reducing rejectable levels of porosity and bow waves in final parts, and also reduces rework and repair costs to remove resin pooling. Additionally, reduced porosity and distortion in composite parts enables lower safety margin in design factor analysis to facilitate design of components having reduced weight to improve aircraft performance.

One embodiment is an apparatus including a caul plate for co-curing or co-bonding a first composite part and a second composite part. A body of the caul plate includes a lower surface to face a top surface of the first composite part, a reference edge to locate the second composite part on the first composite part, and an upper surface that is opposite to the lower surface. The lower surface includes one or more bends to match one or more slopes in the top surface of the first composite part. The one or more bends correspond with ply changes in the first composite part.

Another embodiment is a method of using a caul plate to fabricate a first composite part and a second composite part together. The method includes positioning the caul plate, comprising one or more bends on a lower surface of the caul plate that match one or more slopes in a top surface of the first composite part, adjacent with the second composite part and on top of the top surface of the first composite part such that the one or more bends are in contact with the one or more slopes. The one or more bends correspond with ply changes in the first composite part. The method further includes curing the first composite part and the second composite part together with the caul plate in position, and removing the caul plate from the first composite part and the second composite part to produce a finished part.

Yet another embodiment is an apparatus including a caul plate for co-curing a skin panel and a stiffening member. The caul plate includes a body including side members and a base member that fit adjacent to the stiffening member, a lower surface to face a top surface of the skin panel, and an upper surface opposite to the lower surface to face a vacuum bag during the co-curing of the skin panel and the stiffening member. The lower surface includes one or more bends that match one or more slopes in the top surface of the skin panel. The one or more bends correspond with ply changes in the skin panel.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
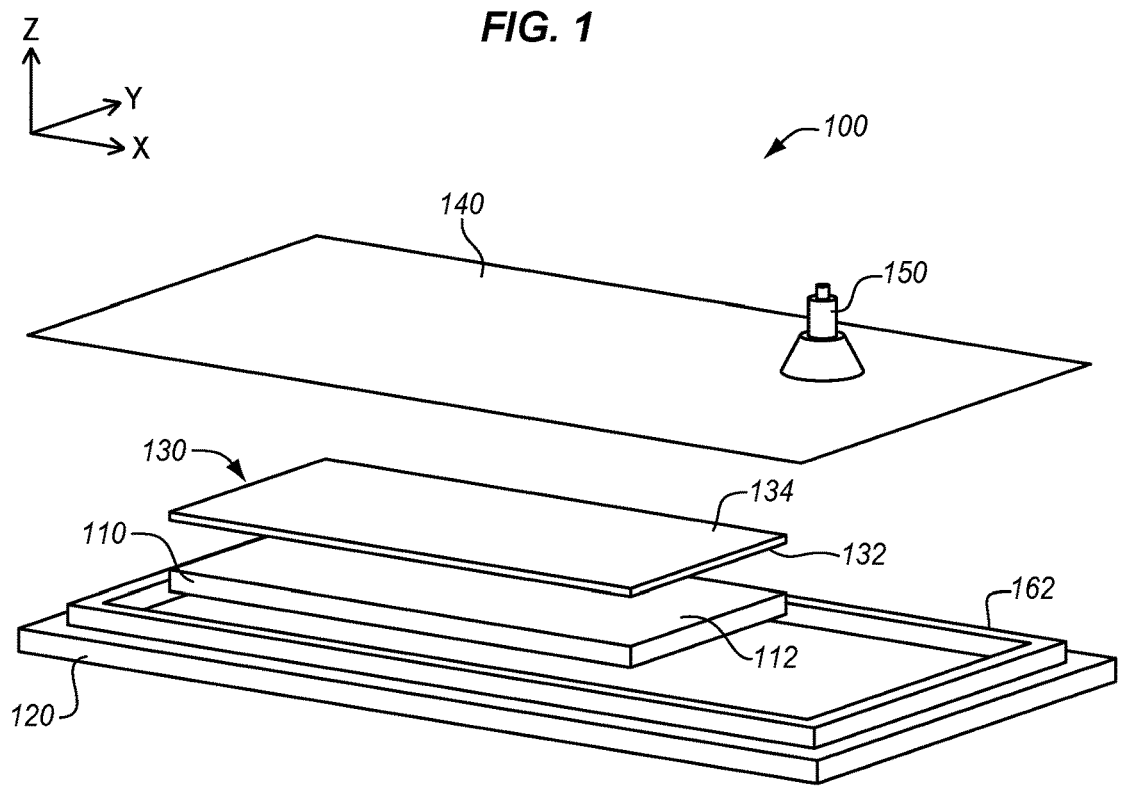
FIG. 1 is a perspective exploded view of a composite fabrication system in an illustrative embodiment.

FIG. 1 is a perspective exploded view of a composite fabrication system 100 in an illustrative embodiment. The composite fabrication system 100 is configured to manufacture composite structures, such as a composite part of an aircraft. In doing so, the composite fabrication system 100 applies heat and pressure to infuse a resin into a preform 110. After the resin is infused, the composite fabrication systems 100 cures the preform 110 into a hardened structure, creating the desired composite part.

Generally, the composite fabrication system 100 includes a tool mandrel 120, a caul plate 130, a vacuum bag 140, and one or more pressure source(s) 150. The preform 110 may include layers or plies of fibers, such as carbon fibers or fiberglass fibers, that are laid-up on the tool mandrel 120 and placed under the caul plate 130. The tool mandrel 120 (sometimes referred to as a mandrel, mold tool, or forming tool) thus provides a base or surface which supports and shapes one side of the preform 110. The caul plate 130 generally comprises a rigid or semirigid body that defines a surface shape for the other side of the preform 110. In particular, the caul plate 130 includes a lower surface 132 which faces a top surface 112 of the preform 110, and an upper surface 134 that is opposite to the lower surface 132.

The vacuum bag 140 seals to the tool mandrel 120 via sealing tape 162, and encloses the preform 110 to form a chamber. The pressure source 150 (e.g., vacuum pump) creates a pressure differential in the chamber to draw resin into the preform 110. After the preform 110 is sufficiently infused with the resin, the preform 110 may be cured with a curing temperature and pressure to form the composite part. The pressure that the caul plate 130 applies to the top surface 112 of the preform 110 during the cure process helps form a smooth surface and reduce interlaminar voids and interlaminar out-of-plane distortion (i.e., bow waves) in the final part. However, in circumstances in which the preform 110 includes irregularities in the top surface 112, a flat caul surface does not match with the irregularities, potentially resulting in undesirable structural weaknesses in the final part that may lead to less than optimal performance. Accordingly, as described in greater detail below, the caul plate 130 is enhanced to include bends in the lower surface 132 to match the irregularities in the top surface 112 of the preform 110.

Figure 2A:
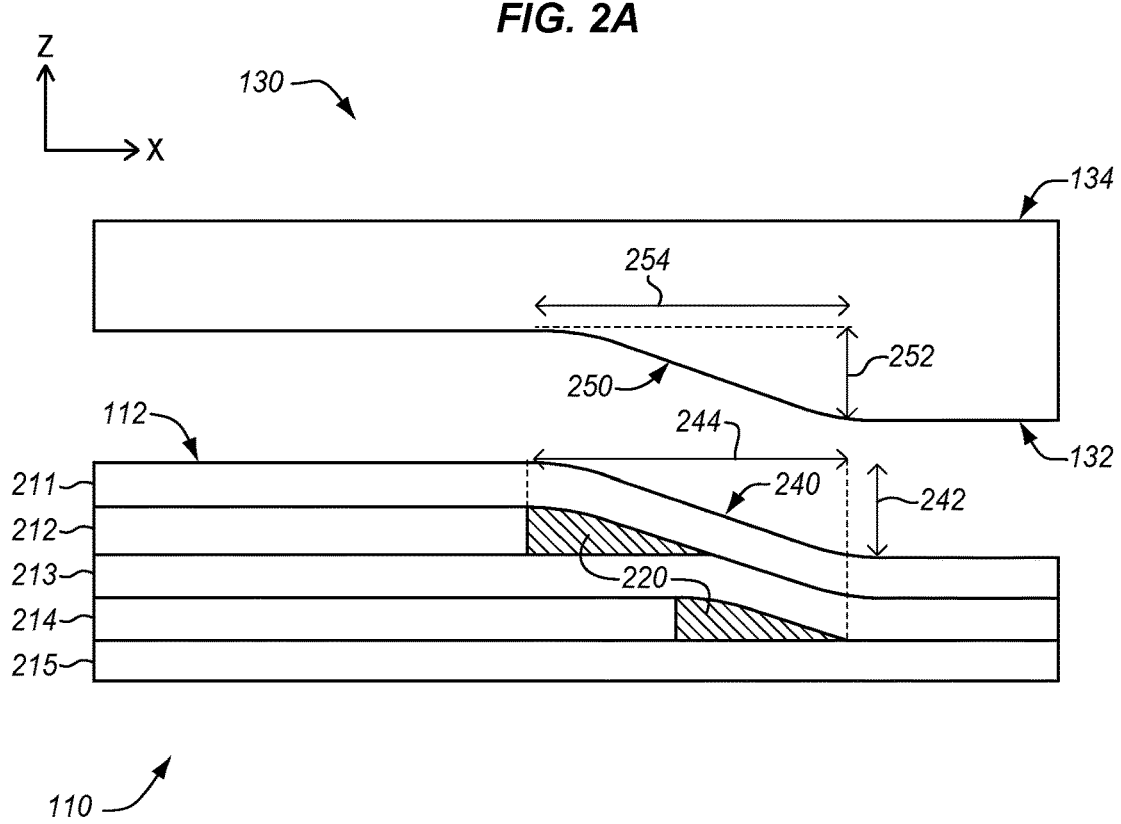
FIG. 2A is a side view of a cross-sectional portion of the preform and the caul plate in an illustrative embodiment.

FIG. 2A is a side view of a cross-sectional portion of the preform 110 and the caul plate 130 in an illustrative embodiment. The preform 110 is made of plies 211-215 of fibrous material stacked on top one another. The plies 211-215 generally have a uniform thickness. However, in this example, plies 212 and 215 comprise ply drop-offs that terminate at certain planar locations (e.g., in the x-direction). This creates resin pockets 220 in the preform 110 and causes the top surface 112 of the preform 110 to form a slope 240 that declines or tapers the thickness of the preform 110. Although a height change 242 in the top surface 112 may be relatively small (e.g., 2-3 ply drops may cause a total surface drop of approximately 0.017 inches), a typical flat caul surface may be unable to sufficiently compact the resin pockets 220, potentially resulting in undesirable characteristics to the final part such as porosity, resin pooling, and distortions.

The caul plate 130 is therefore enhanced with a bend 250 in the lower surface 132 that matches the slope 240 in the preform 110 caused by ply changes. The bend 250 includes a height deviation 252 over a planar distance 254 that corresponds with the height change 242 in the top surface 112 of the preform 110 over a same planar distance 244. In other words, the shape and location of the bend 250 correspond with the shape and location of the slope 240 in the preform 110. Accordingly, with the caul plate 130 pressed against the preform 110 for curing, the lower surface 132 conforms and remains in contact with the preform 110 at the slope 240, thus applying even compaction to the resin pockets 220 and suppressing porosity, resin pooling, and distortions in the preform 110 and the resulting cured final composite part.

Figure 2B:
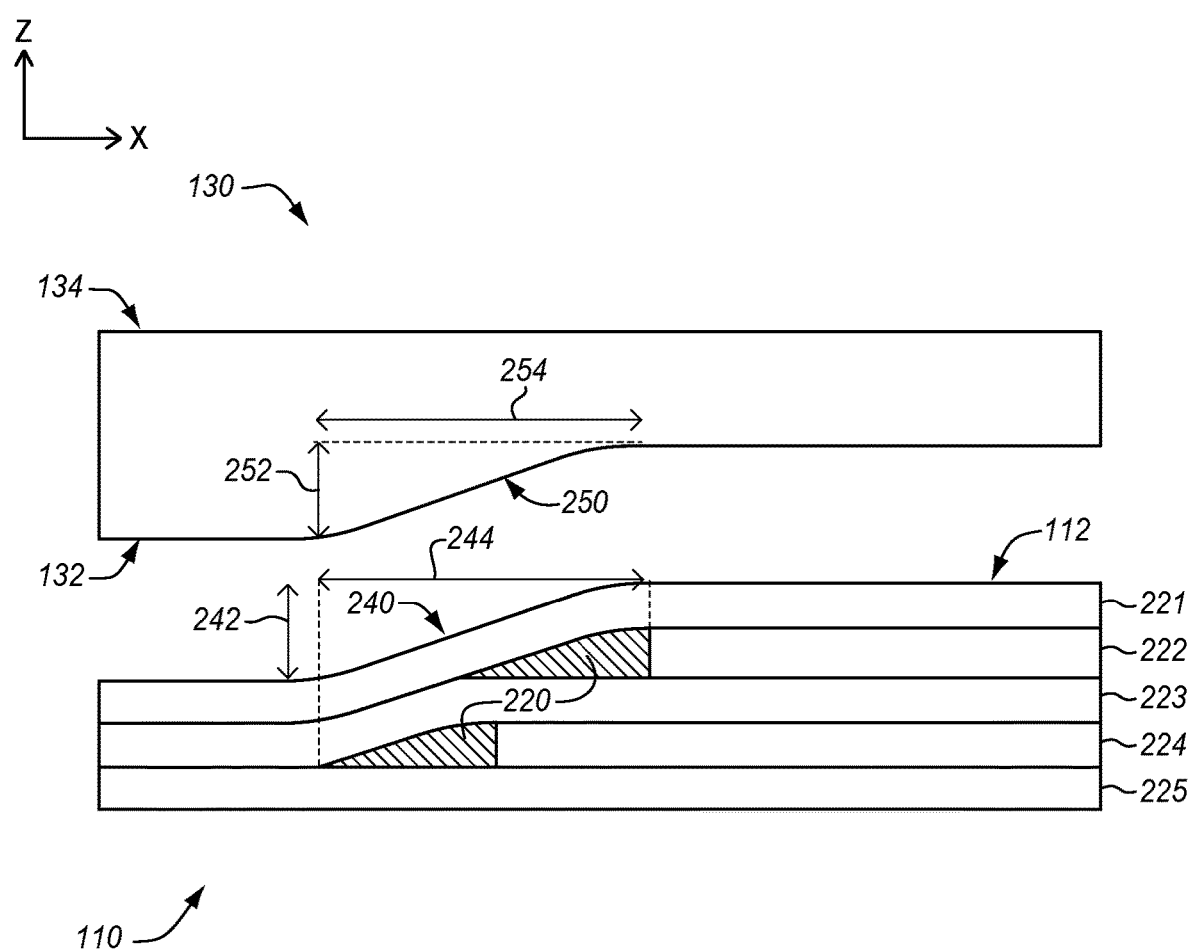
FIG. 2B is a side view of a cross-sectional portion of the preform and the caul plate in another illustrative embodiment.

FIG. 2B is a side view of a cross-sectional portion of the preform 110 and the caul plate 130 in another illustrative embodiment. In this example, plies 221-225 of the preform 110 are laid on top of each other, and plies 222 and 224 comprise ply pad-ups that incline the top surface 112 of the preform 110. Thus, although FIG. 2A illustrates an example in which the preform 110 includes ply drop-offs at particular locations (e.g., to reduce stress concentrations or achieve a desired thickness or weight in the final part), it will be appreciated that the caul plate 130 may additionally or alternatively be constructed to conform with the preform 110 having ply pad-ups in which localized plies are added for load carrying purposes, increased thickness for fasteners, etc. Thus, the bend 250 may correspond with a decline in the top surface 112 caused by ply drop-offs or with an incline in the top surface 112 caused by ply pad-ups.

Additionally, although the caul plate 130 of FIGS. 1-2B is shown and described with respect to the composite fabrication system 100 of FIG. 1, it will be appreciated that the caul plate 130 may be used in any number of alternative composite fabrication processes and resin distribution systems, including pre-preg processes where the fiber material is pre-impregnated with resin. Additionally, the composite fabrication system 100 may include various consumable items not shown for ease of illustration, such as a peel ply, vacuum lines, breathers, etc., that may be removed and disposed after demold. Additional examples of components not shown include a resin distribution medium having a permeable membrane to enable the resin to flow and distribute into the preform 110. It will also be appreciated that alternative types and configurations of components, such as additional vacuum bags and alternative types of sealing members, are also possible.

Figure 3:
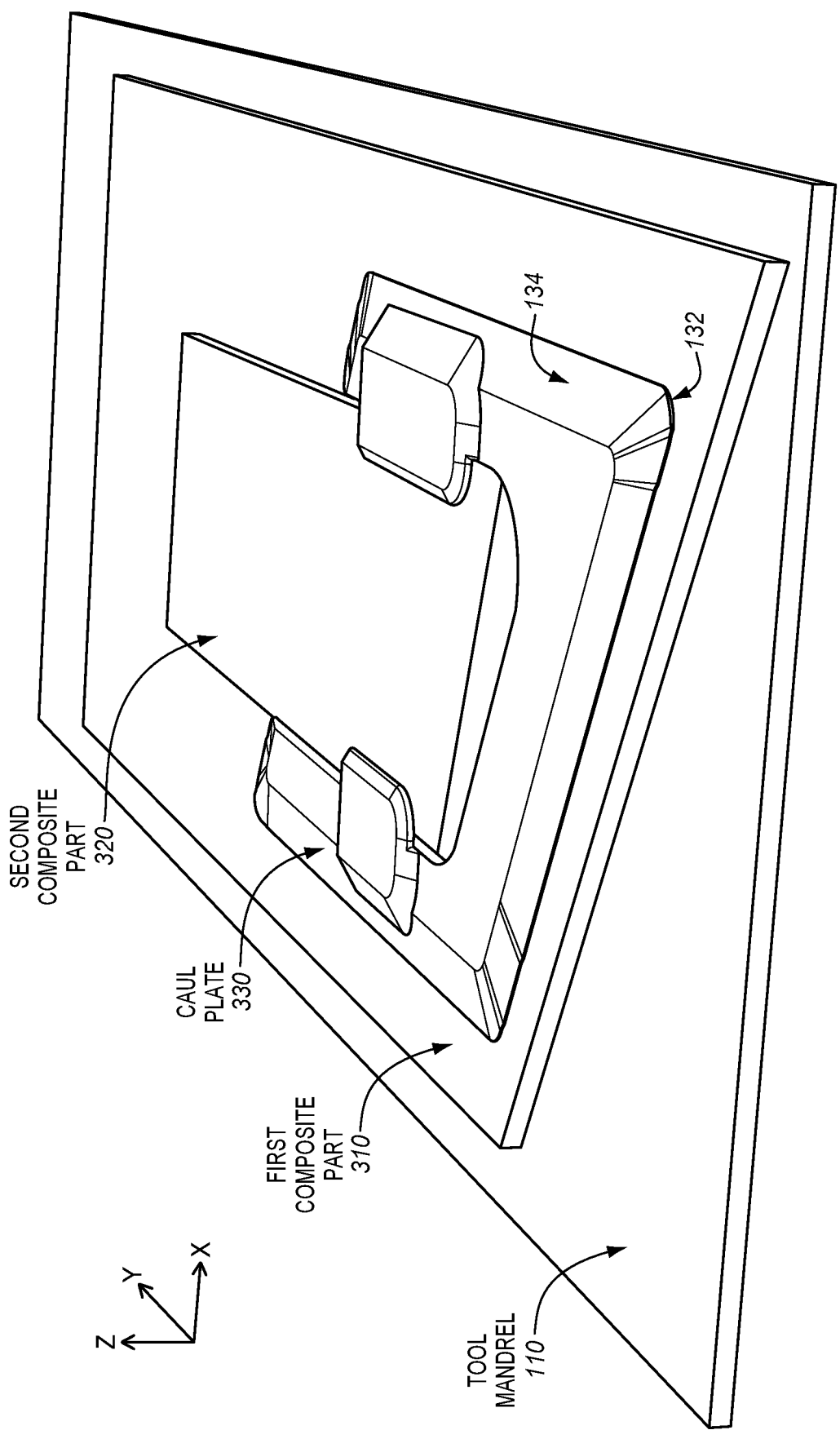
FIG. 3 is a perspective view of a caul plate for co-curing or co-bonding multiple composite parts in an illustrative embodiment.

FIG. 3 is a perspective view of a caul plate 330 for co-curing or co-bonding multiple composite parts in an illustrative embodiment. A first composite part 310 and a second composite part 320 may be laid up together as a dry or wet stack to be cured or bonded together (e.g., using composite fabrication system 100 or similar resin curing processes). For example, the first composite part 310 may comprise an aircraft skin panel and the second composite part 320 may comprise a stiffening member such as a stringer of a wing or stabilizer of an aircraft.

The caul plate 330 is configured to locate the second composite part 320 onto the first composite part 310, and to enhance the bond at the junction therebetween. Similar to that previously described with respect to the caul plate 130 of FIGS. 1-2, the caul plate 330 includes the lower surface 132 which faces a top surface of the first composite part 310, and the upper surface 134 that is opposite to the lower surface 132. In one embodiment, the caul plate 330 is made of a rigid material to distribute pressure proximate to the junction between the first composite part 310 and the second composite part 320.

Figure 4A:
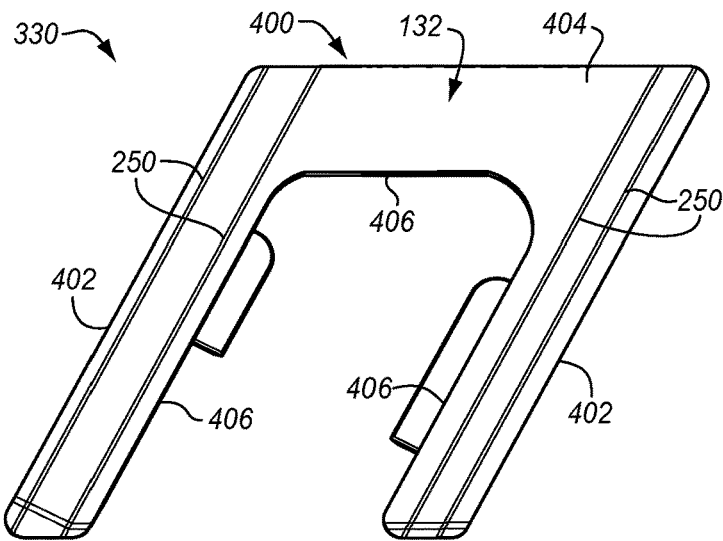
FIG. 4A is a bottom view of the caul plate in an illustrative embodiment.
Figure 4B:
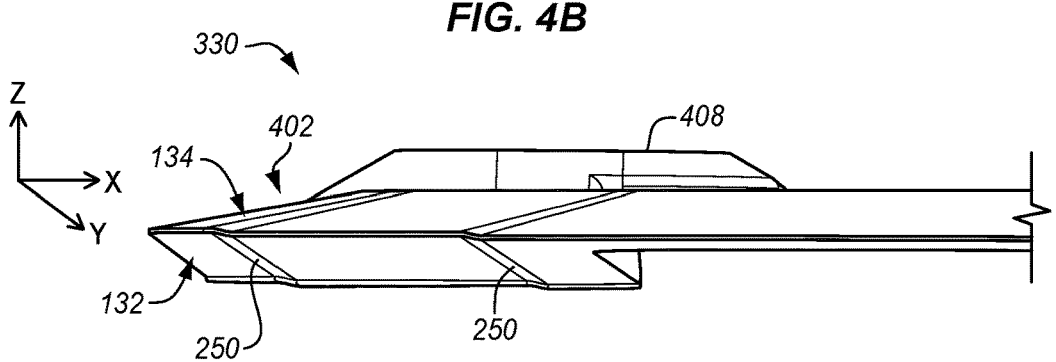
FIG. 4B is a side perspective view of a portion of the caul plate in an illustrative embodiment.
Figure 4C:
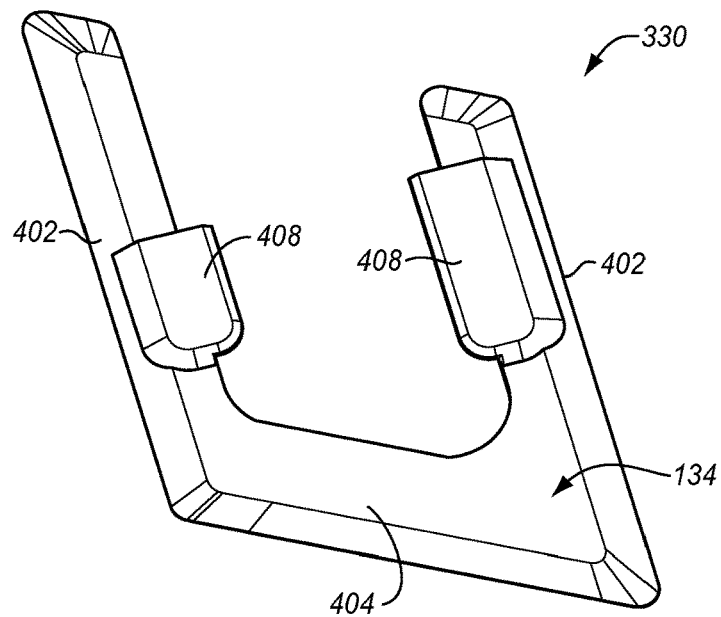
FIG. 4C is a top view of the caul plate in an illustrative embodiment.

FIGS. 4A-C show the caul plate 330 in various views. In particular, FIG. 4A is a bottom view of the caul plate 330 in an illustrative embodiment. FIG. 4B is a side perspective view of a portion of the caul plate 330 in an illustrative embodiment. And, FIG. 4C is a top view of the caul plate 330 in an illustrative embodiment.

As shown in FIG. 4A, the caul plate 330 comprises a body 400 including side members 402 and a base member 404 that define a reference edge 406 to locate the second composite part 320 on the first composite part 310. The body 400 may comprise a U-shaped body with the reference edge 406 configured to fit adjacent to the second composite part 320 (e.g., the stiffening member). The caul plate 330 is therefore configured to locate the second composite part 320 with respect to the first composite part 310 for bonding or curing the composite parts together.

Additionally, the lower surface 132 of the caul plate 330 includes one or more bends 250 configured to reduce bow waves proximate to the junction between the first composite part 310 and the second composite part 320. In one embodiment, and as shown in FIGS. 4A-B, a side member 402 of the caul plate 330 may include one or more bends 250 along the lower surface 132 to extend along a length of the side member 402 (e.g., in a y-direction parallel with a length of the stiffening member). Each bend 250 may comprise a step or ramp of height change in the lower surface 132 in a direction across the length of the side member 402 (e.g., for a defined portion in the x-direction) to correspond with ply changes in the first composite part 310. Additionally, as shown in FIG. 4C, the upper surface 134 of the caul plate 330 may include one or more removal features 408 to facilitate removal of the caul plate 330 from the composite parts after cure.

Figure 5A:
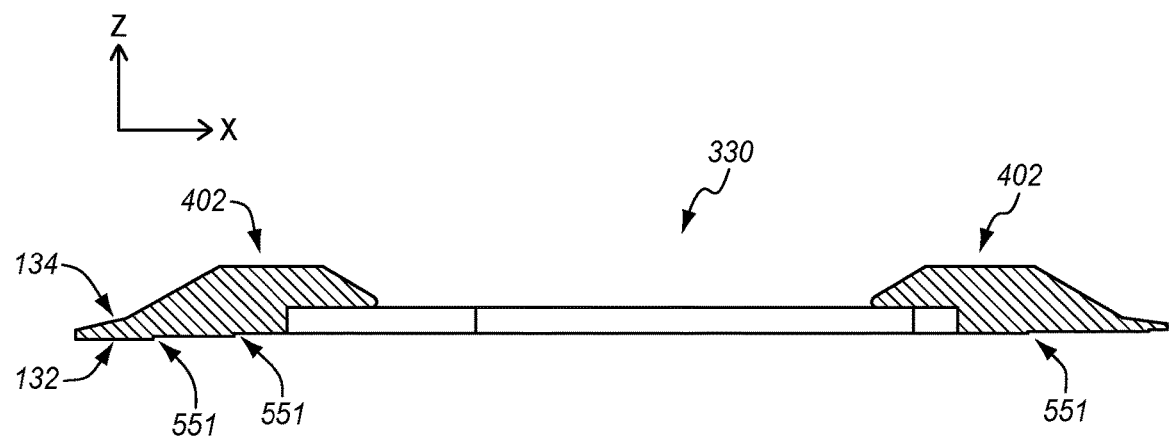
FIG. 5A is a side view of the caul plate in another illustrative embodiment.

FIG. 5A is a side view of the caul plate 330 in another illustrative embodiment. In particular, the lower surface 132 of the caul plate 330 includes steps 551 that correspond with ply changes in the first composite part 310. The steps 551 may match ply changes in the laminate for height and edge location. For example, ply thickness may range from 0.003 to 0.040 inches and the number and size of steps 551 match the planar location (e.g., in the x-y plane) and height change (e.g., in a vertical z direction) of added or terminated plies.

Figure 5B:
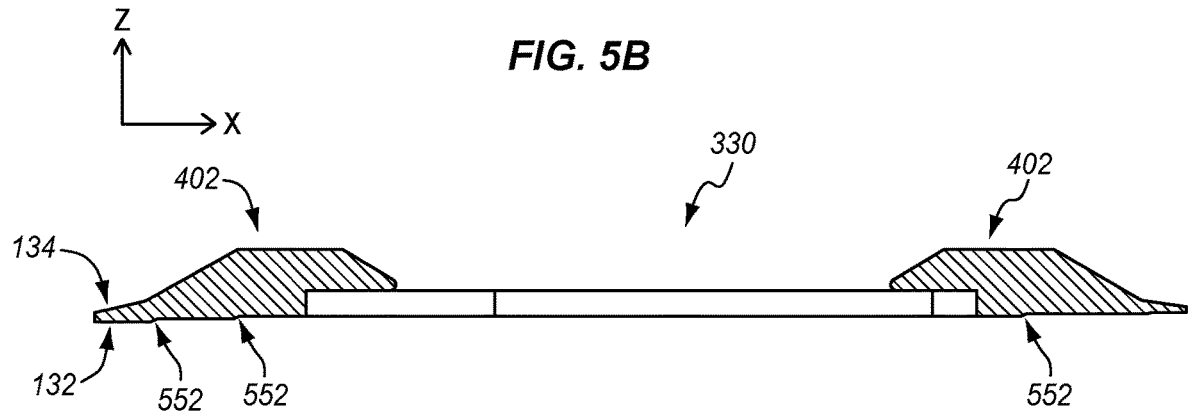
FIG. 5B is a side view of the caul plate in yet another illustrative embodiment.

FIG. 5B is a side view of the caul plate 330 in yet another illustrative embodiment. In this example, the lower surface 132 of the caul plate 330 includes ramps 552 that correspond with ply changes in the first composite part 310. The angle/size of each of the ramps 552 may similarly vary depending on ply thickness, spacing, and/or the quantity/location of ply changes. Compared with steps 551, the ramps 552 may gradually incline or decline the lower surface 132 to correspond with ply changes and resulting contour of the top surface 112 of an uncured composite or laminate.

Figure 6A:
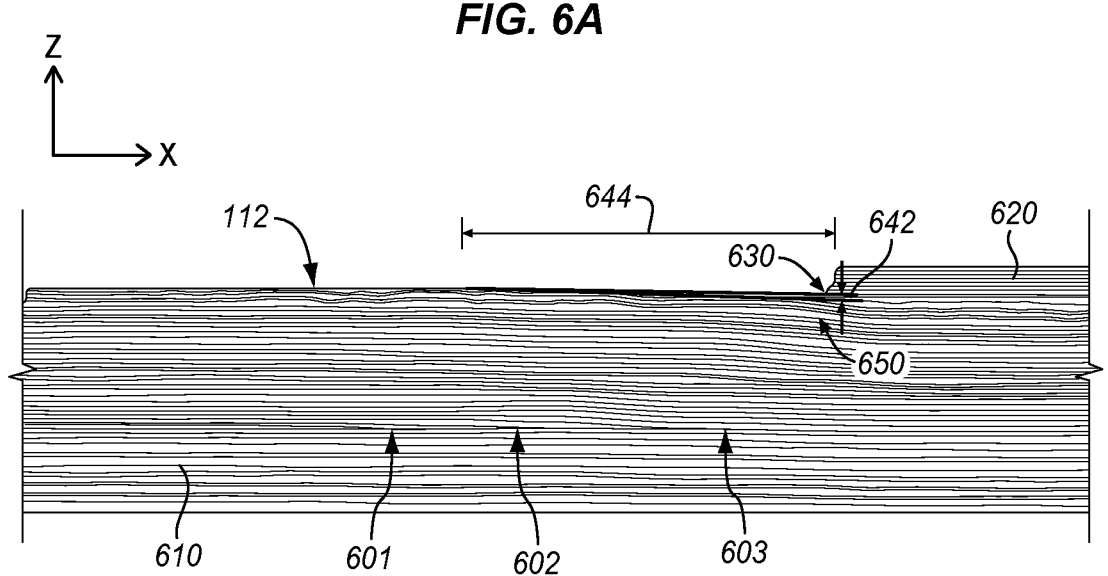
FIG. 6A is an example illustration of a cross-sectional side view of a skin panel and stringer cured with a flat caul surface.
Figure 6B:
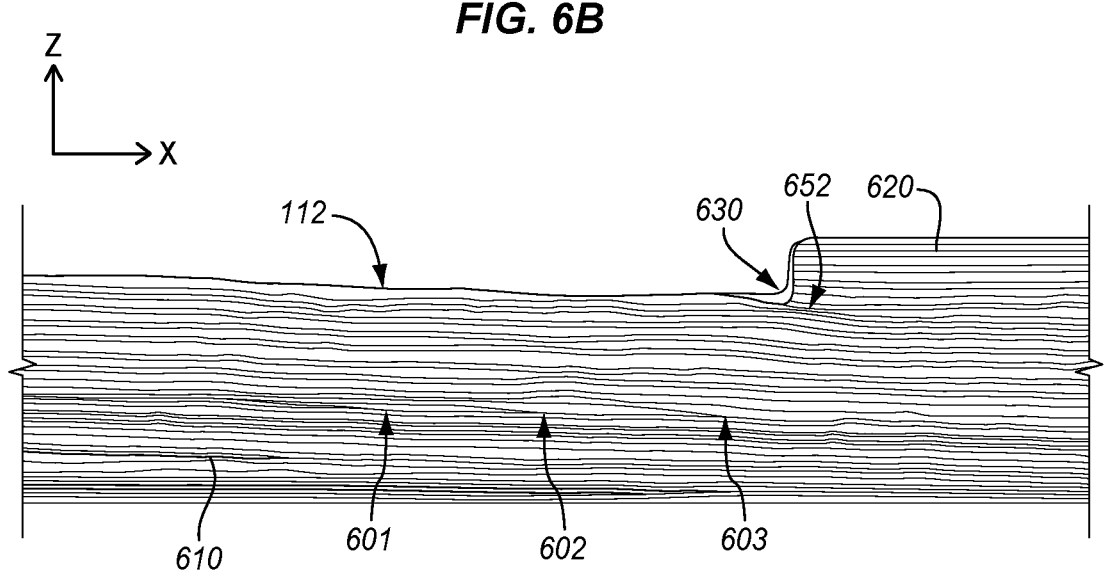
FIG. 6B is a cross-sectional side view of the skin panel and stringer cured with a caul plate having bends in its lower surface in an illustrative embodiment.

FIG. 6A is an example illustration of a cross-sectional side view of a skin panel 610 and stringer 620 cured with a flat caul surface. FIG. 6B is a cross-sectional side view of the skin panel 610 and stringer 620 cured with the caul plate 330 having bends 250 in its lower surface 132 in an illustrative embodiment. As shown in FIG. 6A, the skin panel 610 includes ply drops 601-603 that decline its top surface 112 in a direction toward a junction 630 between the skin panel 610 and the stringer 620. For example, the top surface 112 may taper a height 642 approximately 0.017 inches over a distance 644 of approximately 1.5 inches with individual ply drops of 0.007 to 0.008 inches thickness. Unfortunately, a rigid flat caul surface cannot adequately conform along the areas with surface geometry changes in the top surface 112, and the differential stiffness of components (e.g., in this case, the skin panel 610 and the stringer 620) may undesirably create a bow wave 650 in the laminate proximate to the junction 630, as shown in FIG. 6A. The bow wave 650 corresponds with out-of-plane distortion in the co-cured or co-bonded final composite that weakens its structure and thus may lead to less than optimal performance.

By contrast, FIG. 6B shows the result of using the caul plate 330 with bends 250 which are tailored to the ply drops 601-603 and irregularities in the top surface 112 of the skin panel 610. That is, the one or more bends 250 may correspond with the decline in the top surface 112 such that the lower surface 132 of the caul plate 330 remains in contact with the top surface 112 of the first composite part 310 in the direction toward the junction 630 between the skin panel 610 and the stringer 620. These one or more bends 250 reduce bow waves proximate to the junctions between the first composite part and the second composite part. For instance, since the caul plate 330 is configured to apply even pressure during cure at the area proximate to the junction 630, the bow wave 652 in the laminate is substantially suppressed as compared to the bow wave 650 resulting from a flat caul surface. Like the caul plate 130 described in FIGS. 1-2, the caul plate 330 may be used in any number of composite fabrication processes and resin distribution systems, and may comprise alternative shapes, configurations of bends 250, etc.

Figure 7:
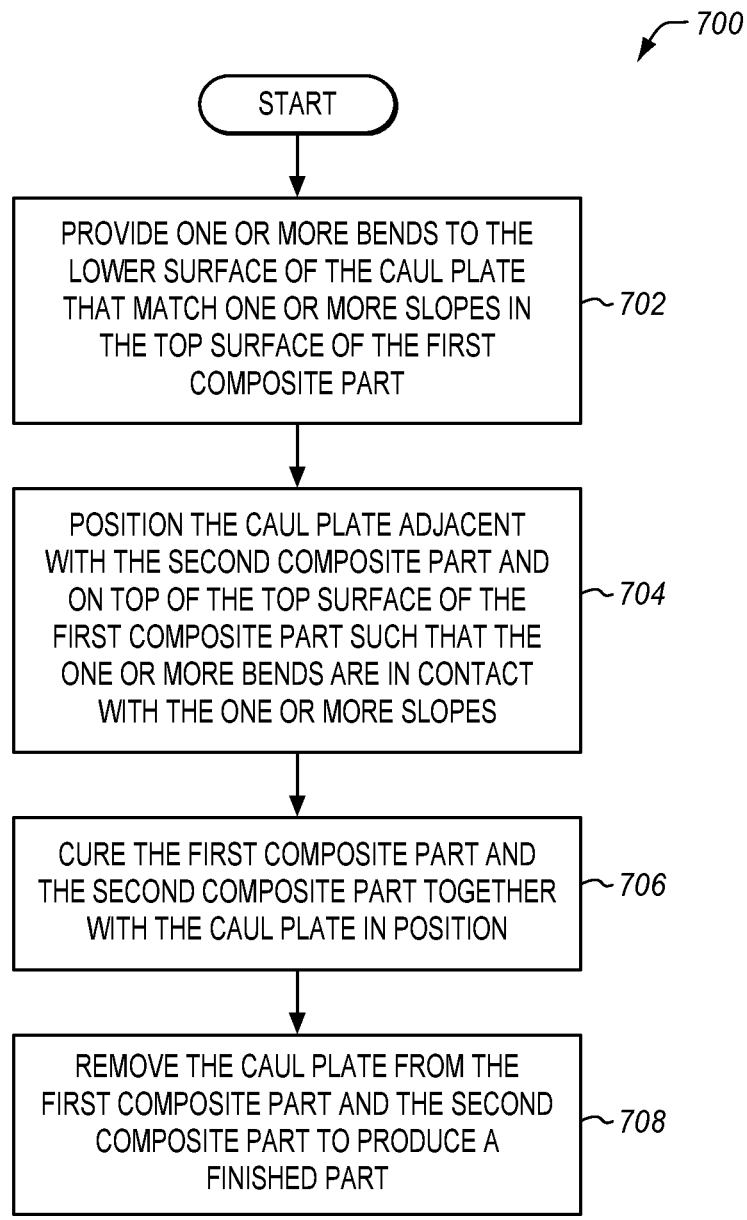
FIG. 7 is a flowchart illustrating a method of using a caul plate to fabricate a first composite part and a second composite part together in an illustrative embodiment.

FIG. 7 is a flowchart illustrating a method 700 of using a caul plate to fabricate a first composite part and a second composite part together in an illustrative embodiment. The steps of the method 700 are described with reference to the caul plate 130/330 of FIGS. 1-5, but those skilled in the art will appreciate that method 700 may be performed in other systems and alternative caul plates as desired. The steps of the flowcharts described herein are not all inclusive and may include other steps not shown. The steps described herein may also be performed in an alternative order.

In step 702, one or more bends 250 are provided to the lower surface 132 of the caul plate 330 that match one or more slopes 240 in the top surface 112 of the first composite part 310. The providing of the one or more bends 250 may include selecting a shape of the one or more bends 250 based on locations of ply drop-offs and/or ply pad-ups in the first composite part 310. In one embodiment, the one or more bends 250 are imparted to the lower surface 132 of the caul plate 330 via an additive manufacturing process. For example, the caul plate 330 may be constructed with a laser sintering processing capable of achieving a minimum feature size of 0.012 inches with accuracy within 0.005 inches. Alternatively or additionally, caul plate fabrication may be performed by machining the lower surface 132 to include the bends 250.

The surface geometry of the lower surface 132 may be derived from the engineering part definition, or as developed by manufacturing pre-production development activity, or a combination thereof. For example, given information of ply drop-off or pad-up locations in the laminate, surface fluctuations may be calculated for constructing the caul plate 330 tailored for the part. Where multiple components are cured or bonded to a surface (e.g., multiple stringers on a skin panel), multiple caul plates may be fabricated with each tailored to the ply changes underneath their respective cure positions. The one or more bends 250 may thus include steps configured to match ply drop-offs or ply pad-ups in the first composite part 310, or may include a ramp to match a profile of ply drop-offs or ply pad-ups in the first composite part 310.

In step 704, the caul plate 330 is positioned adjacent with the second composite part 320 and on top of the top surface 112 of the first composite part 310 such that the one or more bends 250 are in contact with the one or more slopes 240. In step 706, the first composite part 310 and the second composite part 320 are cured together with the caul plate 330 in position. And, in step 708, the caul plate 330 is removed from the first composite part 310 and the second composite part 320 to produce a finished part. The method 700 provides a substantial benefit over prior techniques because it reduces or eliminates porosity, resin pooling, and out-of-plane distortion. Component yield is improved by reducing rejectable levels of porosity and bow waves in final parts and decreasing manufacturing costs. Additionally, reduced porosity and distortion in composite parts enables lower safety margin in design factor analysis to facilitate design of components having reduced weight to improve aircraft performance.

Although specific embodiments are described herein, the scope of the disclosure is not limited to those specific embodiments. The scope of the disclosure is defined by the following claims and any equivalents thereof.

What is claimed is:

1. An apparatus comprising:
   a first composite part comprising a first ply and one or more additional plies positioned beneath the first ply;
   a second composite part; and
   a caul plate for co-curing or co-bonding the first composite part and the second composite part, the caul plate comprising:
      a body that includes a lower surface to face a top surface of the first composite part, a reference edge to locate the second composite part on the first composite part, and an upper surface that is opposite to the lower surface,
      wherein the lower surface includes one or more bends to match one or more slopes in the top surface of the first composite part, and
      wherein the one or more bends correspond with ply changes in the first composite part, the top surface of the first composite part comprises the first ply covering resin pockets disposed at locations of the bends, wherein the resin pockets are disposed at endpoints of the one or more additional plies, and the resin pockets are compacted by the bends via the top surface.

2. The apparatus of claim 1 wherein:
   the first composite part includes ply drops that decline the top surface of the first composite part in a direction toward a junction between the first composite part and the second composite part, and
   the one or more bends correspond with the decline in the top surface such that the lower surface of the caul plate remains in contact with the top surface of the first composite part in the direction toward the junction between the first composite part and the second composite part.

3. The apparatus of claim 2 wherein:
   the caul plate is made of a rigid material to distribute pressure proximate to the junction between the first composite part and the second composite part.

4. The apparatus of claim 2 wherein:
   the one or more bends are configured to reduce bow waves proximate to the junction between the first composite part and the second composite part, by evenly applying pressure proximate to the junction during cure.

5. The apparatus of claim 1 wherein:
   the first composite part is a skin panel,
   the second composite part is a stringer, and
   the reference edge locates the stringer with respect to the skin panel.

6. The apparatus of claim 1 wherein:
   the one or more bends include steps configured to match ply drop-offs or ply pad-ups in the first composite part, wherein each step is disposed at a location of a corresponding ply drop-off or ply pad-up, and corresponds with a size of a corresponding ply drop-off or ply pad-up.

7. The apparatus of claim 1 wherein:
   the one or more bends include a ramp to match a profile of ply drop-offs or ply pad-ups in the first composite part.

8. The apparatus of claim 1 wherein:
   the one or more bends are imparted to the lower surface of the caul plate via an additive manufacturing process.

9. A method of using a caul plate to fabricate a first composite part and a second composite part together, the method comprising:
   wherein the first composite part comprises a first ply and one or more additional plies positioned beneath the first ply;
   positioning the caul plate, comprising one or more bends on a lower surface of the caul plate that match one or more slopes in a top surface of the first composite part, adjacent with the second composite part and on top of the top surface of the first composite part such that the one or more bends are in contact with the one or more slopes, wherein the one or more bends correspond with ply changes in the first composite part,
   wherein the top surface of the first composite part comprises the first ply covering resin pockets disposed at locations of the bends, wherein the resin pockets are disposed at endpoints of the one or more additional plies, and the resin pockets are compacted by the bends via the top surface;
   curing the first composite part and the second composite part together with the caul plate in position; and
   removing the caul plate from the first composite part and the second composite part to produce a finished part.

10. The method of claim 9 further comprising:
    providing the one or more bends to the lower surface of the caul plate that match the one or more slopes in the top surface of the first composite part.

11. The method of claim 10 wherein:
    the providing of the one or more bends to the lower surface includes selecting a shape of the one or more bends based on locations of ply drop-offs in the first composite part.

12. The method of claim 10 wherein:
    the providing of the one or more bends to the lower surface includes selecting a shape of the one or more bends based on locations of ply pad-ups in the first composite part.

13. The method of claim 10 wherein:

the providing of the one or more bends to the lower surface includes imparting the one or more bends to the lower surface of the caul plate via an additive manufacturing process.

14. The method of claim 9 wherein:

the first composite part includes ply drops that decline the top surface of the first composite part in a direction toward a junction between the first composite part and the second composite part, and the one or more bends correspond with the decline in the top surface such that the lower surface of the caul plate remains in contact with the top surface of the first composite part in the direction toward the junction between the first composite part and the second composite part.

15. The method of claim 9 wherein:

the caul plate is made of a rigid material to distribute pressure proximate to a junction between the first composite part and the second composite part.

16. An apparatus comprising:

a skin panel comprising a first ply and one or more additional plies positioned beneath the first ply;

a stiffening member; and a caul plate for co-curing the skin panel and the stiffening member, the caul plate comprising:

a body including side members and a base member that fit adjacent to the stiffening member;

a lower surface to face a top surface of the skin panel; and an upper surface opposite to the lower surface to face a vacuum bag during the co-curing of the skin panel and the stiffening member, wherein the lower surface includes one or more bends that match one or more slopes in the top surface of the skin panel, and wherein the one or more bends correspond with ply changes in the skin panel, the top surface of the skin panel comprises the first ply covering resin pockets disposed at locations of the bends, wherein the resin pockets are disposed at endpoints of the one or more additional plies, and the resin pockets are compacted by the bends via the top surface.

17. The apparatus of claim 16 wherein:

the skin panel includes ply drops that decline the top surface of the skin panel in a direction toward a junction between the skin panel and the stiffening member, and the one or more bends correspond with the decline in the top surface such that the lower surface of the caul plate remains in contact with the top surface of the skin panel in the direction toward the junction between the skin panel and the stiffening member.

18. The apparatus of claim 16 wherein:

the caul plate is made of a rigid material to distribute pressure proximate to a junction between the skin panel and the stiffening member.

19. The apparatus of claim 16 wherein:

the one or more bends are configured to reduce bow waves proximate to a junction between the skin panel and the stiffening member, by evenly applying pressure proximate to the junction during cure.

20. The apparatus of claim 16 wherein:

the one or more bends are imparted to the lower surface of the caul plate via an additive manufacturing process.

\* \* \* \* \*